Nov. 1, 1932.    M. GOLDSMITH    1,885,518

TOILET KIT

Filed July 12, 1932

Maurice Goldsmith
INVENTOR

BY Robert B Kilgore
ATTORNEY

Patented Nov. 1, 1932

1,885,518

UNITED STATES PATENT OFFICE

MAURICE GOLDSMITH, OF NEW YORK, N. Y.

TOILET KIT

Application filed July 12, 1932. Serial No. 622,057.

My invention relates to toilet kits adapted to contain toilet articles and it is my object to provide means for holding a mirror within said kit in such a manner that it may be available for use either as part of the kit or separately and yet will not be easily broken, and also to provide means by which the kit may be suspended with the mirror face out when in use.

Figure 1:
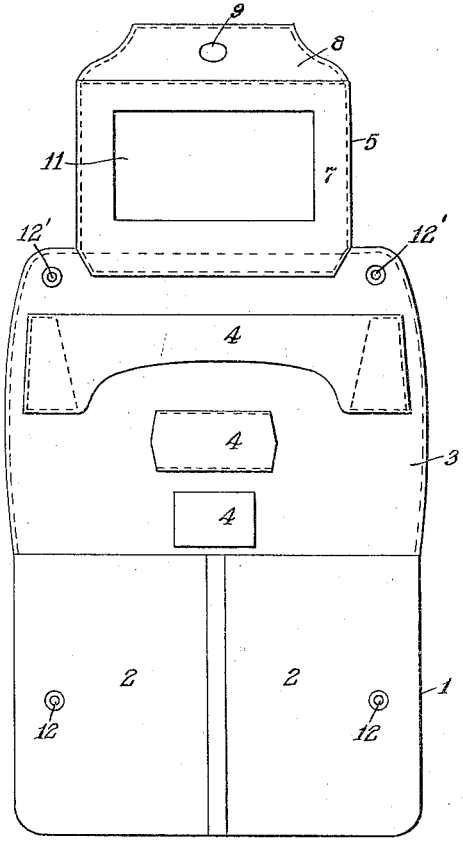
Figure 2:
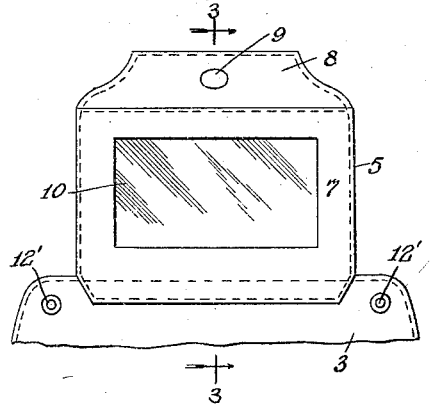
Figure 3:
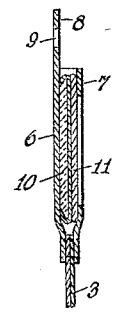
Figure 5:
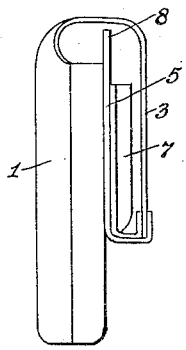
Figure 4:
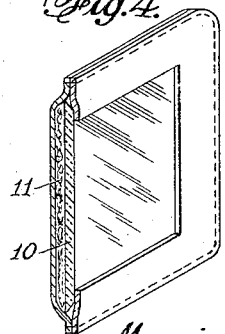

In the drawing Fig. 1 is a plan view of a toilet kit embodying my invention in open position; Fig. 2 a detail view of the mirror flap with the face of the mirror exposed; Fig. 3 a detail sectional view of a portion of the structure of Fig. 2 on the line 3—3 thereof; Fig. 4 a view of the padded mirror, partly in section; and Fig. 5 a view of the kit and mirror in closed condition.

My improved kit comprises a body portion 1, provided with means 2 for holding toilet articles. A cover flap 3, also provided with means 4 for retaining toilet articles, is hingedly secured to the body portion 1. A mirror flap 5 is hingedly secured to a free edge of the cover flap. This mirror flap 5 has a solid back 6, preferably of leather or the like, and a front frame 7 secured to the back as best shown in Fig. 3. The mirror flap may be provided with a tab 8 which has an aperture 9 for hanging the kit up in use.

A mirror 10 is provided with a padded back 11 and may be slipped into the frame on the mirror flap 5. When the kit is to be closed the mirror is turned in the frame so that the padded back is exposed through the frame and the padded side will bear against the toilet articles in the cover flap 3. When the kit is in use the mirror is reversed in the frame in the mirror flap 5 so that the padded back is against the back 6 of the mirror flap and the reflecting surface of the mirror exposed in the frame on the mirror flap.

In this way the padded back of the mirror protects the glass from injurious contact with the toilet articles when the kit is closed and the glass face of the mirror has the thickness of the mirror flap and cover flap to protect it from accidental damage from outside shocks and blows.

I have shown but one form of toilet kit in the drawing as it is obvious that my invention may be applied to any toilet kit having a flap closure.

Any means other than the snap fasteners 12—12 may be used for securing the cover flap to the body of the kit when it is closed.

I claim:—

1. In a toilet kit comprising a body, a cover flap hingedly secured thereto and means for holding the cover flap to the body when closed, a mirror flap secured to a free edge of the cover flap, a frame secured to said mirror flap and a padded back mirror in said frame for the purpose set forth.

2. In a toilet kit comprising a body, a cover flap hingedly secured thereto and means for holding the cover flap to the body when closed, a mirror flap secured to a free edge of the cover flap, a tab at the top edge of said mirror flap provided with means for suspending the kit, a frame secured to said mirror flap and a padded back mirror in said frame for the purpose set forth.

In testimony whereof, I have affixed my signature.

MAURICE GOLDSMITH.